March 22, 1949.  K. H. ANDREN  2,464,959
ROTARY MOTION TRANSMITTING MECHANISM
Filed June 17, 1947  2 Sheets-Sheet 1
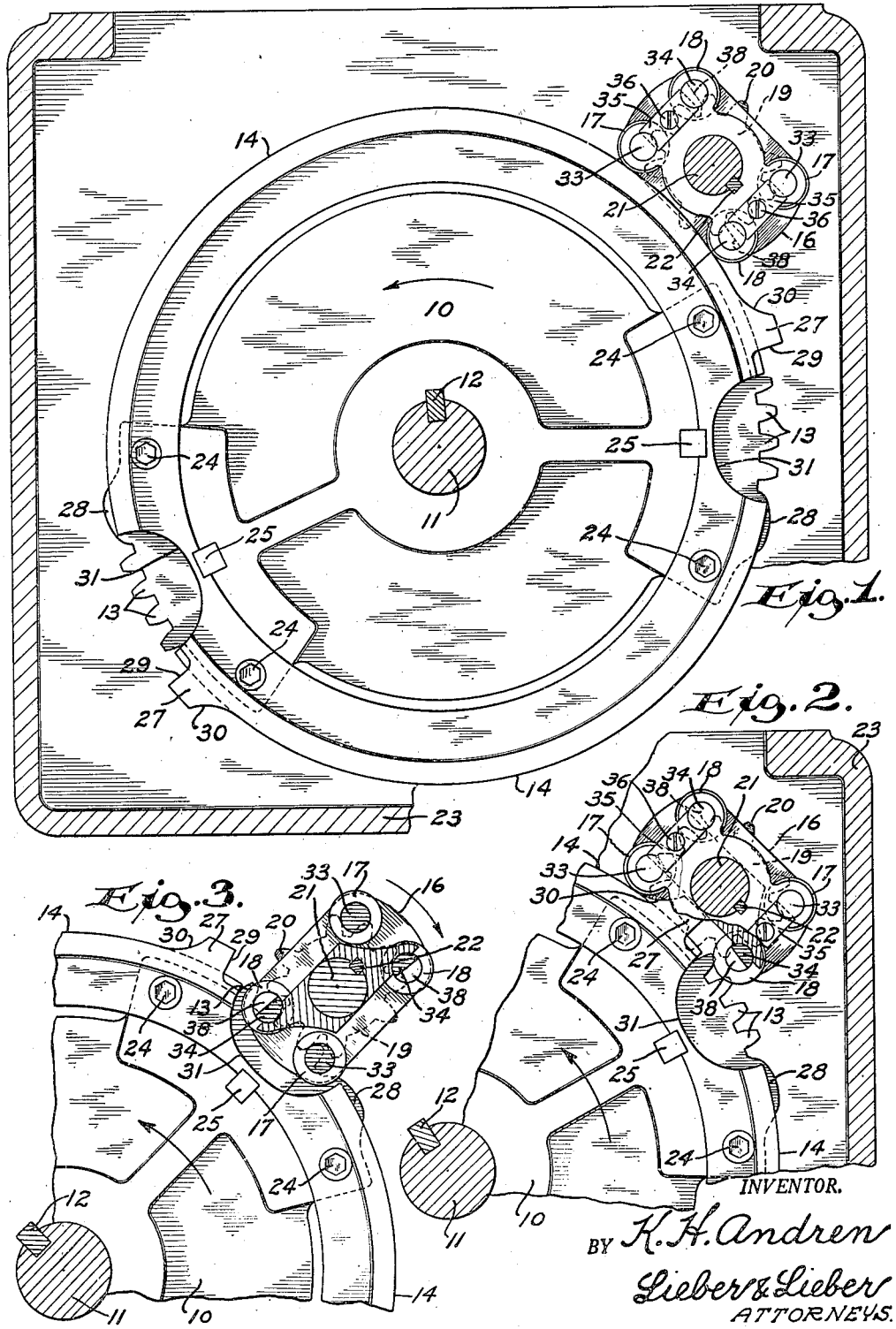
INVENTOR.
BY K. H. Andren
Lieber & Lieber
ATTORNEYS.

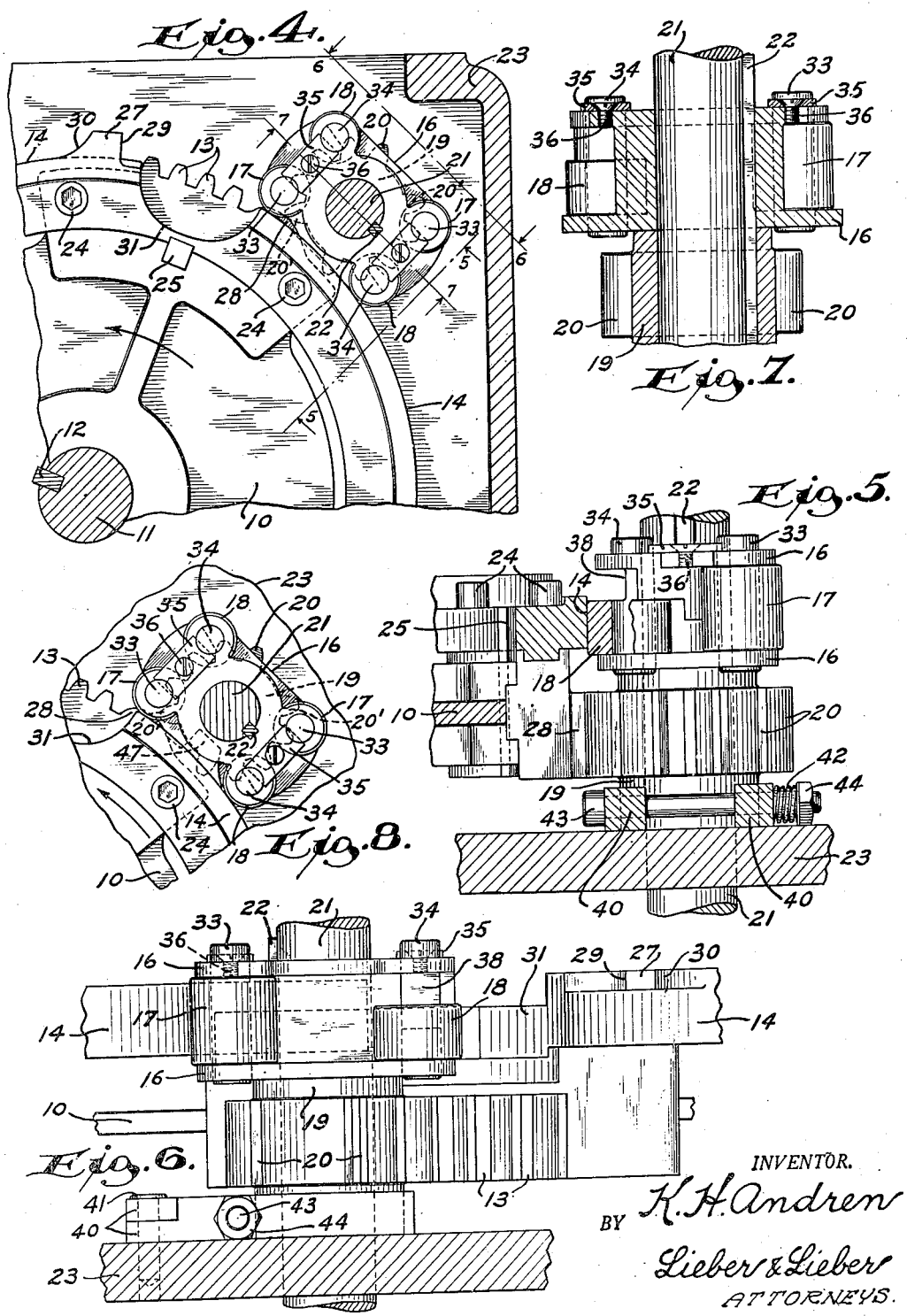

Patented Mar. 22, 1949

2,464,959

UNITED STATES PATENT OFFICE 2,464,959

ROTARY MOTION TRANSMITTING MECHANISM

Karl H. Andren, Greenfield, Wis., assignor to Artos Engineering Company, Milwaukee, Wis., a corporation of Wisconsin Application June 17, 1947, Serial No. 755,092

12 Claims. (Cl. 74—435)

1

The present invention relates generally to improvements in mechanical rotary motion transmission assemblages, and relates more specifically to improvements in the construction and operation of motion transmitting mechanism of the type shown and described in my prior patent, No. 2,254,766, granted September 2, 1941, and wherein the continuous rotation of a driving element in either direction may be converted into intermittent rotary motion of a driven element.

The mechanism of the above identified prior patent embodies two identical acceleration and deceleration members or lugs carried by the driving element and disposed at the opposite ends of each series of driving gear teeth for the purpose of gradually accelerating the driven pinion element so as to produce smooth and noiseless engagement of the teeth of the two cooperating elements for rotation of the driver in either direction. When rotating in one direction, one of the lug members of each complementary pair would accelerate the driven element while the other would decelerate this element, where as reverse rotation would also reverse the functioning of the lugs. Although these lugs are the prior assemblage always operated perfectly for acceleration purposes, they caused considerable difficulty under certain conditions of operation when performing their decelerating functions, due to back-lash occasioned by necessary variations in driving ratios and resultant changes in gear tooth pitch, because of variations in speed of rotation of the elements, and due to load changes. It has however been found unnecessary to utilize these mechanisms for reverse rotation purposes under most conditions of operation, and I have discovered that the above mentioned difficulties and objections may be readily eliminated by providing modified deceleration instrumentalities for the driven element in substitution of or in addition to the prior lug type decelerators.

It is therefore a primary object of my present invention to provide simple and highly efficient means for effecting smooth and noiseless deceleration of the driven element in an intermittent rotary motion transmitting mechanism of the type shown and described in my prior patent, and for eliminating objectionable back-lash between the parts of the driving and driven gear elements.

Another object of the present invention is to provide an improved rotary motion transmitting assemblage which is especially adapted to effectively convert the constant rotation of a driving shaft or the like, into intermittent rotary motion of a driven shaft or the like, at any predetermined intervals and under varying conditions of operation and use.

Still another object of this invention is to provide a durable and reliable intermittent rotary motion transmitter adapted for diverse purposes, and for various speeds and speed ratios.

These and other objects and advantages of the present invention will be apparent from the following description.

A clear conception of the features constituting my present improvement, and of the mode of constructing and of operating a typical rotary motion transmitter embodying the invention, may be had by referring to the drawings accompanying and forming a part of this specification in which like reference characters designate the same or similar parts in the various views.

Fig. 1 is a plan view of a typical intermittent rotary motion transmitting mechanism showing the driving and driven shafts and the housing in section, and also showing the driving element in the act of rotating while the driven element is at rest and locked against rotation;

Fig. 2 is a fragmentary similar view showing the driven shaft and gear element unlocked for rotation and the lug for initiating rotation thereof about to act;

Fig. 3 is another fragmentary similar view showing the driven element being rotated by virtue of the intermeshing of its teeth with those of the driving element;

Fig. 4 is still another fragmentary similar view showing the improved decelerating cam in action just after completion of a period of rotation of the driven elements;

Fig. 5 is an enlarged fragmentary section through the driving element and an elevational view of the driven element, the section having been taken along the line 5—5 of Fig. 4.

Fig. 6 is another similarly enlarged part sectional elevation of the driven element and a portion of the driving element, taken along the line 6—6 of Fig. 4;

Fig. 7 is still another similarly enlarged central section through the driven element, taken along the line 7—7 of Fig. 4; and Fig. 8 is a view similar to that of Fig. 4 but showing the application of one of the improved decelerating cams to a rotary motion transmitter especially adapted to transmit heavy loads at high speed.

Although the invention has been shown and described herein as being applicable to a rotary motion transmitter adapted to impart half a revolution from a continuously revolving driving shaft to a single intermittently rotatable driven shaft, twice during each complete revolution of the driver, it is not my desire or intention to unnecessarily restrict the utility of the improvement by virtue of this limited typical embodiment, since the novel features may also be duplicated to cause a single rotary driver to intermittently impart one or more partial or complete revolutions to two or more driven elements.

Referring to Figs. 1 to 7 inclusive of the drawing, the typical improved rotary motion transmitting mechanism shown comprises in general, a driving element consisting of a rotor or member 10 secured to a power shaft 11 by means of a key 12 or the like, and having local similar sets of peripheral gear teeth 13 and peripheral rim segments 14 connecting the ends of the two sets; and a driven element consisting of a bracket 16 having long and short rollers 17, 18 respectively journalled therein for coaction with the rim segments 14, and a pinion 19 having teeth 20 adapted to mesh with the driving teeth 13, both the bracket 16 and pinion being secured to the driven shaft 21 by means of a key 22 or the like. The power shaft 11 may be rotated either continuously or intermittently in the direction indicated by the arrows, from any suitable source to correspondingly revolve the locally toothed driving member 10, and the driven shaft 21 may be drivingly associated with any desired intermittently operable motion utilizing device; while the two shafts 11, 21 may be journalled for rotation in bearings carried by the mechanism housing 23 to which abundant lubrication may be supplied.

The two peripheral rim segments 14 of the rotor 10 have outer curved surfaces constituting parts of a common cylindrical surface having the rotor axis as a generating center, and these segments may either be formed integral with or rigidly attached to the rotor 10 as by screws 24 and keys 25. Each of the rim segments 14 is provided at its trailing end with an outwardly projecting pinion accelerating lug 27, and each set of gear teeth 13 is provided at its trailing end with a pinion decelerating cam tooth or projection 28, these lugs 27 and projections 28 being revolvable about the rotor axis in off-set or different planes one within the path of travel of the cylindrical surfaces of the segments 14 and the other within the path of travel of the teeth 13. Each of the accelerating lugs 27 has an approximately radial surface 29 facing the adjacent set of gear teeth 13, and a curved opposite surface 30, these surfaces 29, 30 being connected by a short outer surface. Each of the cam tooth projections 28 is provided with an outer convexly curved surface extending from the last tooth 13 of the adjacent set to a point well beyond the end of the adjacent rim segment 14, and these cam projections 28 in fact constitute enlarged or circumferentially widened teeth at the trailing ends of the gear tooth sets. The lug 27 and projection 28 of each complementary pair, are separated by recesses 31, and the teeth 13 carried by the rotor 10 extend across and into these recesses.

As previously indicated, the roller carrying bracket 16 and the pinion 19 are firmly attached to the driven shaft 21 by a key 22, and the rollers 17, 18 are journalled for rotation on pivot pins 33, 34 respectively which are rigidly secured to the side plates of the bracket 16 by means of locking plates 35. The opposite ends of each of these locking plates 35 engage notches near the ends of the adjacent pivot pins 33, 34 and the plates 35 are detachably secured to the bracket 16 by screws 36, thus fixing the pins against rotation and axial displacement while still permitting ready removal of these pins. The pins 33 on which the long rollers 17 are journalled are cylindrical throughout their lengths except for the notches engaged by the plates 35; but the pins 34 which carry the short rollers 18 are provided with cut-outs 38 for permitting free passage of the peripheral lugs 27 therethrough during rotation of the rotor 10. The longer rollers 17 are adapted to be engaged by the accelerating lugs 27 and by the full widths of the segments 14; but due to the shortening of the rollers 18 and the provision of the cut-outs 38, these rollers 18 are engageable only with surfaces of the segments 14 and not with the lugs 27.

The toothed pinion 19 is of the mutilated type, having two diametrically opposite teeth omitted so as to provide proper clearance for the action of the decelerating cams or projections 28 whenever the adjacent sets of gear teeth 13 have completed a partial rotation of the driven pinion 19 and shaft 21. The driven shaft 21 is also preferably provided with a friction brake comprising a pair of shoes 40 swingably secured to the housing 23 by a pivot pin 41 and resiliently urged against the hub of the pinion 19 by a spring 42 coacting with an adjusting bolt 43 and nut 44 as shown in Figs. 5 and 6. This brake will obviate undesirable noise and backlash when the motion of the shafts 11, 21 is suddenly arrested, but the use of such brake is not essential.

After the typical intermittent rotary motion transmitter has been constructed and properly assembled as above described, during normal operation of this improved mechanism the power shaft 11 and rotor member 10 may be rotated either continuously or intermittently so as to intermittently rotate the pinion 19 and shaft 21 in the opposite direction, as indicated by the arrows in Fig. 3. During such rotation of the driving shaft 11, let it be assumed that the driving and driven elements are momentarily positioned as in Fig. 1 wherein both rollers 17, 18 at one side of the driven element are coacting with the outer cylindrical surface of the adjacent revolving segment 14 in advance of one of the lugs 27 and of the corresponding set of gear teeth 13. As this lug 27 approaches the position shown in Fig. 2, the curved surface 30 thereof will gradually engage the adjacent long roller 17 and will thus cause the advancing lug to initially rotate and to gradually but effectively accelerate the rotary motion of the driven element until the peripheral speed of the pinion 19 is equal to that of the driving member 10.

The teeth 20 of the pinion 19 will thus be brought gradually and without shock into mesh with the adjacent set of teeth 13 of the driver as shown in Fig. 3, and the pinion 19 and driven shaft 21 will be rotated half a revolution. During this rotation of the pinion 19, the rollers 17, 18 which are nearest to the member 10, will ride freely through the recesses 31; and as the end of the half revolution of the pinion 19 is approached, one of the widely spaced teeth 20, 20' at the side of this pinion adjoining the member 10, will engage and ride along the adjacent cam tooth projection 28 and will stop at the cam crest, as illustrated in Fig. 4. While this pinion tooth 20' is thus coacting with the projection 28, the rollers 17, 18 nearest the rotor 10 will also be brought into coaction with the cylindrical outer surface of the segment 14 beyond the set of driving teeth 13 which has just been active, and these rollers 17, 18 will thereafter ride along the segment surface until the next set of rotor teeth 13 is encountered. The gradual engagement of this tooth 20' of the widely spaced pinion teeth 20, 20' with the cam tooth projection 28 as in Fig. 4 and the continuation of this engagement until the rollers 17, 18 have contacted the segment 14, effectively decelerates the rotary motion of the pinion 19 smoothly and without shock, thus providing for most efficient acceleration and deceleration of the frictionally restrained or loaded driven element during each successive or intermittent rotation thereof.

When a resilient brake such as shown in Figs. 5 and 6 is applied to the driven element, backlash at the various coacting parts will be positively eliminated, and when transmitting heavy loads and/or motion at high speed, it may be desirable to utilize a modified motion transmitter such as depicted in Fig. 8. This modified assemblage, besides embodying an accelerating lug 27, and a decelerating tooth or projection 28 at the adjacent set of driving teeth 13, also embodies a decelerating lug 47 at the trailing end of each set of these driving teeth, as in my prior patent hereinabove referred to. This additional decelerating lug 47 cooperates with the conjugate cam tooth 28 to insure smooth deceleration, and avoids possible backlash between the tooth 28 and the pinion teeth 20, 20'.

It is to be noted, that whenever two of the rollers 17, 18 of the driven element coact with the outer cylindrical surface of a segment 14, the driven shaft 21 is locked against rotation, and this lock is released only when the rotor 10 reaches the position shown in Fig. 2, wherein one roller 18 has traveled beyond the end of the advancing segment 14 and is within the adjacent recess 31. The successive or intermittent half rotations of the driven element will continue at equal intervals as long as the driving shaft 11 continues to rotate, and while the mechanism specifically illustrated is adapted to impart only a partial revolution to the driven shaft 21 twice during each complete revolution of the driving shaft, the extent of rotation of the driven shaft and the intervals elapsing between successive rotations thereof, may be readily varied to suit conditions by merely varying the lengths of the segments 14 and the number of teeth 13 in the successive sets.

From the foregoing detailed description it will be apparent that the present invention provides a simple, compact, and highly efficient mechanism for transferring intermittent rotary motion to a driven element from a driving element which is either continuously or intermittently rotated, in a manner whereby the driven element is intermittently revolved, effectively accelerated and decelerated, and locked against rotation by the driving element during periods of rest. The rollers 17, 18, positively lock the driven element against rotation and the rollers 17 coact with the projections 27 to produce smooth and gradual acceleration, whereas the cam projections 28 provide means for likewise decelerating the motion of the driven element. By utilizing a resilient brake associated with the driven element, objectionable backlash may be effectively minimized, and by also utilizing a lug 47 cooperable with the rollers, backlash is completely and positively eliminated and the mechanism may be utilized for the transmission of great power. The single driving element may obviously be utilized to intermittently actuate one or more driven elements, and the degree of rotation of the driven elements during each driving period may also be readily altered by merely varying the number of teeth 13 in each successive group. The present improvement has proven highly successful in actual use and has eliminated the difficulties encountered with the prior motion transmitting mechanism covered by my previous patent, and either type of the improved assemblage may be utilized for diverse purposes wherever a driving element is adapted to impart intermittent rotary motion to one or more driven elements.

It should be understood that it is not desired to limit the present invention to the exact details of construction or to the precise mode of operation, herein shown and described, for various modifications within the scope of the appended claims may occur to persons skilled in the art; and it is also contemplated that specific descriptive terms used herein be given the broadest possible interpretation consistent with the disclosure.

I claim:

1. In a rotary motion transmitter, a rotary driving element, a driven element intermittently rotatable by said driving element, rollers carried by said driven element and revolvable about the axis of rotation of said driven element and being alternately cooperable with said driving element to gradually accelerate said driven element at the beginning of each driving period and to prevent rotation of said driven element during interims between driving periods, and a cam operable by said driving element and functioning independently of said rollers for gradually decelerating said driven element at the end of each driving period.

2. In a rotary motion transmitter, a rotary driving element, a driven element intermittently rotatable by said driving element, rollers carried by said driven element and being alternately cooperable with said driving element to gradually accelerate said driven element at the beginning of each driving period and to prevent rotation of said driven element during interims between driving periods, and a cam projection revolvable by said driving element and coacting with said driven element independently of said rollers to gradually decelerate the driven element at the end of each driving period.

3. In a rotary motion transmitter, a rotary driving element, a driven element intermittently rotatable by said driving element, rollers carried by said driven element and being alternately cooperable with said driving element to gradually accelerate said driven element at the beginning of each driving period and to prevent rotation of said driven element during interims between driving periods, a cam operable by said driving element and functioning independently of said rollers for gradually decelerating said driven element at the end of each driving period, and a brake for constantly resiliently retarding the rotation of said driven element.

4. In a rotary motion transmitter, a driving element having local sets of peripheral teeth and smooth peripheral surfaces between the successive tooth sets, a driven pinion having teeth adapted to mesh with said sets of driving gear teeth to periodically rotate the pinion, rollers carried by said pinion and being cooperable with said surfaces to prevent rotation of the pinion, an accelerating lug carried by said driving element in advance of each of said driving tooth sets and being cooperable with said rollers to accelerate said pinion at the beginning of each period of rotation of the pinion, and a cam at the trailing end of each of said tooth sets for decelerating said driven element at the end of each of said periods independently of said rollers.

5. In a rotary motion transmitter, a driving element having local sets of peripheral teeth and smooth peripheral surfaces between the successive tooth sets, a driven pinion having teeth adapted to mesh with said sets of driving gear teeth to periodically rotate the pinion, rollers carried by and revolvable about the axis of rotation of said pinion and being cooperable with said surfaces to prevent rotation of the pinion, an accelerating lug carried by said driving element in advance of each of said driving tooth sets and being cooperable with said rollers to accelerate said pinion at the beginning of each period of rotation of the pinion, and a cam at the trailing end of each of said tooth sets for decelerating said driven element at the end of each of said periods independently of said rollers.

6. In a rotary motion transmitter, a driving element having local sets of peripheral teeth and smooth peripheral surfaces between the successive tooth sets, a driven pinion having teeth adapted to mesh with said sets of driving gear teeth to periodically rotate the pinion, rollers carried by and revolvable about the axis of rotation of said pinion and being cooperable with said surfaces to prevent rotation of the pinion, an accelerating lug carried by said driving element in advance of each of said driving tooth sets and being cooperable with said rollers to accelerate said pinion at the beginning of each period of rotation of the pinion, and a cam tooth at the trailing end of each of said driving tooth sets for decelerating said driven pinion at the end of each of said periods independently of said rollers.

7. In a rotary motion transmitter, a driving element having local sets of peripheral teeth and smooth peripheral surfaces between the successive tooth sets, a driven pinion having teeth adapted to mesh with said sets of driving gear teeth to periodically rotate the pinion, rollers carried by and revolvable about the axis of rotation of said pinion and being cooperable with said surfaces to prevent rotation of the pinion, an accelerating lug carried by said driving element in advance of each of said driving tooth sets and being cooperable with said rollers to accelerate said pinion at the beginning of each period of rotation of the pinion, a cam tooth at the trailing end of each of said driving tooth sets for decelerating said driven pinion at the end of each of said periods independently of said rollers, and a brake coacting with said pinion for eliminating backlash at said teeth.

8. In a rotary motion transmitter, a rotary driving element having a series of peripheral teeth and circumferential surfaces adjoining the opposite ends of said series, a rotary driven element having teeth cooperable with said driving element teeth to intermittently rotate the driven element, and means carried by said driven element and coacting with said surfaces to prevent rotation of the driven element during interims between driving periods, said means being cooperable with said driving element to gradually accelerate said driven element at the beginning of each driving period, the last tooth at the trailing end of said series being formed to gradually decelerate said driven element at the end of each driving period.

9. In a rotary motion transmitter, a rotary driving element having a series of peripheral teeth and circumferential surfaces adjoining the opposite ends of said series, a rotary driven element having teeth cooperable with said driving element teeth to intermittently rotate the driven element, and a roller carried by said driven element and coacting with said surfaces to prevent rotation of the driven element during interims between driving periods, said roller being cooperable with said driving element to gradually accelerate said driven element at the beginning of each driving period, the last tooth at the trailing end of said series being formed to gradually decelerate said driven element at the end of each driving period.

10. In a rotary motion transmitter, a rotary driving element having a series of peripheral teeth and circumferential surfaces adjoining the opposite ends of said series, a rotary pinion having teeth cooperable with said driving element teeth to rotate the pinion, rollers carried by and revolvable about the axis of rotation of said pinion and being cooperable with said surfaces to prevent rotation of the pinion, means carried by said driving element and coacting with one of said rollers to accelerate said pinion at the beginning of each driving period, and means carried by said driving element in the path of travel of said teeth for decelerating said pinion at the end of each driving period.

11. In a rotary motion transmitter, a rotary driving element having a series of peripheral teeth and circumferential surfaces adjoining the opposite ends of said series, a rotary pinion having teeth cooperable with said driving element teeth to rotate the pinion, rollers carried by and revolvable about the axis of rotation of said pinion and being cooperable with said surfaces to prevent rotation of the pinion, a lug carried by said driving element and coacting with one of said rollers to accelerate said pinion at the beginning of each driving period, and a cam projection carried by said driving element in the path of travel of said teeth for decelerating said pinion at the end of each driving period.

12. In a rotary motion transmitter, a rotary driving element, a driven element intermittently rotatable by said driving element, rollers carried by said driven element and being alternately cooperable with said driving element to gradually accelerate and decelerate the driven element at the beginning and end of each driving period, and a cam operable by said driving element and functioning independently of said rollers to also decelerate said driven element at the end of said periods.

KARL H. ANDREN.

REFERENCES CITED

The following references are of record in the file of this patent:

UNITED STATES PATENTS

| Number | Name | Date |
|---|---|---|
| 815,979 | Richards | Mar. 27, 1906 |
| 1,847,768 | Kolbassieff | Mar. 1, 1932 |
| 2,254,766 | Andrew | Sept. 2, 1941 |